(12) United States Patent
Huang et al.

(10) Patent No.: US 10,446,882 B2
(45) Date of Patent: Oct. 15, 2019

(54) WIRELESS POWER TRANSMITTING AND RECEIVING CIRCUIT AND DEVICE

(71) Applicant: Shenzhen Hello Tech Energy CO., LTD., Shenzhen (CN)

(72) Inventors: Shaokui Huang, Shenzhen (CN); Zhongwei Sun, Shenzhen (CN)

(73) Assignee: SHENZHEN HELLO TECH ENERGY CO., LTD., Shenzhen (CN)

( * ) Notice: Subject to any disclaimer, the term of this patent is extended or adjusted under 35 U.S.C. 154(b) by 170 days.

(21) Appl. No.: 15/792,780

(22) Filed: Oct. 25, 2017

(65) Prior Publication Data

US 2019/0081368 A1    Mar. 14, 2019

(30) Foreign Application Priority Data

Sep. 11, 2017    (CN) .......................... 2017 1 0812014

(51) Int. Cl.
| | |
|---|---|
| *H01M 10/44* | (2006.01) |
| *H02J 7/02* | (2016.01) |
| *H02J 50/10* | (2016.01) |
| *H02J 50/80* | (2016.01) |
| *H02J 50/00* | (2016.01) |

(52) U.S. Cl.
CPC ............. *H01M 10/44* (2013.01); *H02J 50/10* (2016.02); *H02J 50/80* (2016.02); *H02J 7/025* (2013.01); *H02J 50/00* (2016.02)

(58) Field of Classification Search
None
See application file for complete search history.

(56) References Cited

U.S. PATENT DOCUMENTS

| | | | |
|---|---|---|---|
| 2014/0203661 A1* | 7/2014 | Dayan ................... | H01F 38/14 307/104 |
| 2014/0347008 A1* | 11/2014 | Chae ..................... | H02J 7/025 320/108 |

* cited by examiner

*Primary Examiner* — Jared Fureman
*Assistant Examiner* — Aqeel H Bukhari
(74) *Attorney, Agent, or Firm* — Gokalp Bayramoglu

(57) ABSTRACT

The invention discloses a wireless power transmitting and receiving circuit and device, wherein the circuit includes an interface module, a transmission driving module, a receiving module, a switching module, a power coil, and a control module. The transmission driving module and the receiving module are both connected to the interface module. The transmission driving module includes a power supply switch unit and a transmission driving unit. The control module is configured to control the power supply switch unit and the switching module. The power supply switch unit is configured to connect or disconnect the interface module to the transmission driving unit. The switching module is configured to connect or disconnect the transmission driving module to the power coil through switching, or connect or disconnect the receiving module to the power coil through switching.

20 Claims, 6 Drawing Sheets

WIRELESS POWER TRANSMITTING AND RECEIVING CIRCUIT AND DEVICE

CROSS REFERENCE TO RELATED APPLICATIONS

This application is based upon and claims priority to Chinese Patent Application No. CN 201710812014.7 (CN), filed on Sep. 11, 2017, the entire content of which is incorporated herein by reference.

TECHNICAL FIELD

The invention relates to the wireless power transmission technology, particularly to a wireless power transmitting and receiving circuit and device.

BACKGROUND OF THE INVENTION

Wireless power transmission technology provides more powerful support for the electronic information age, so that the life of people is more convenient. Most of the existing wireless transmitting circuits and the wireless receiving circuits are separate. Though the wireless power receiving function and the wireless power transmitting function can be realized at the same time, the transmitting and receiving are realized by multiple coils. Hence, deficiencies are as follows, i.e., too many coils, large size, heavy weight, incapacity to be miniaturized, high cost, and a waste of resources.

SUMMARY OF THE INVENTION

In order to overcome the deficiencies of the prior art, the invention aims to provide a wireless power transmitting and receiving circuit and device, so that both the wireless power receiving function and the wireless power transmitting function can be achieved. Further, only a single coil/single group of coils is needed, with a small size and a lower cost.

The objective of the invention is realized by the following technical solutions:

A wireless power transmitting and receiving circuit includes an interface module, a transmission driving module, a receiving module, a switching module, a power coil and a control module. The transmission driving module and the receiving module are both connected to the interface module. The transmission driving module includes a power supply switch unit and a transmission driving unit. The control module is configured to control the power supply switch unit and the switching module. The power supply switch unit is configured to connect or disconnect the interface module to the transmission driving unit. The switching module enables the transmission driving module to be connected to the power coil through switching, or enables the receiving module to be connected to the power coil through switching.

Further, the switching module includes a relay. The relay includes a control end and a static contact end, a normally-closed contact end, and a normally-open contact end. The control end is connected to the control module. The static contact end is connected to the power coil.

The normally-closed contact terminal is connected to the transmission driving module, and the normally-open contact end is connected to the receiving module. Alternatively, the normally-closed contact end is connected to the receiving module, and the normally-open contact end is connected to the transmission driving module.

Further, the transmission driving unit includes a transmission control chip and a power driving subunit. The transmission control chip includes a control pin. The power driving subunit includes a controlled pin and a power output port. The control pin is connected to the controlled pin. The power output port is configured to transmit power to the power coil.

Further, the transmission control chip further includes a feedback receiving pin. A feedback circuit is arranged between the power output port and the feedback receiving pin.

Further, the transmission control chip further includes a communication port. The communication port is connected to the power output port.

Further, the power driving subunit includes a control driving chip, a first power tube, and a second power tube. The controlled pin is located on the control driving chip. The control driving chip further includes a first driving pin and a second driving pin. The first driving pin is connected to the first power tube. The second driving pin is connected to the second power tube. An output of the first power tube and an output of the second power tube are both connected to the power output port.

Further, the control driving chip is a TPS28225D chip, and the first power tube and the second power tube are both AON7544 tubes.

Further, the transmitting control chip is a BQ500210 chip.

Further, the receiving module includes a wireless receiving chip. The wireless receiving chip includes a power input port and a charging port. The power input port is configured to obtain power from the power coil. The charging port is connected to the interface module.

Further, the transmission driving module further includes a chip power supply unit. The chip power supply unit includes a power taking end. The power taking end is connected between the power supply switch unit and the transmission driving unit.

A wireless power transmitting and receiving device, includes the above wireless power transmitting and receiving circuit.

Compared with the prior art, the invention has the advantages as below. The switching module is provided to switch the transmission driving to be connected to the power coil. Alternatively, the receiving module is connected to the power coil through switching, so that the power coil can be used for both wireless power transmission mode and wireless power receiving mode. Meanwhile, the interface module and the transmission driving unit are disconnected by the power supply switch unit in a wireless power receiving mode, so that the receiving module can supply power to the interface module. The power coil may include only one coil or a group of coils. With the wireless power transmitting and receiving circuit provided by the invention, the size of the device and the cost can be reduced.

Figure 1:
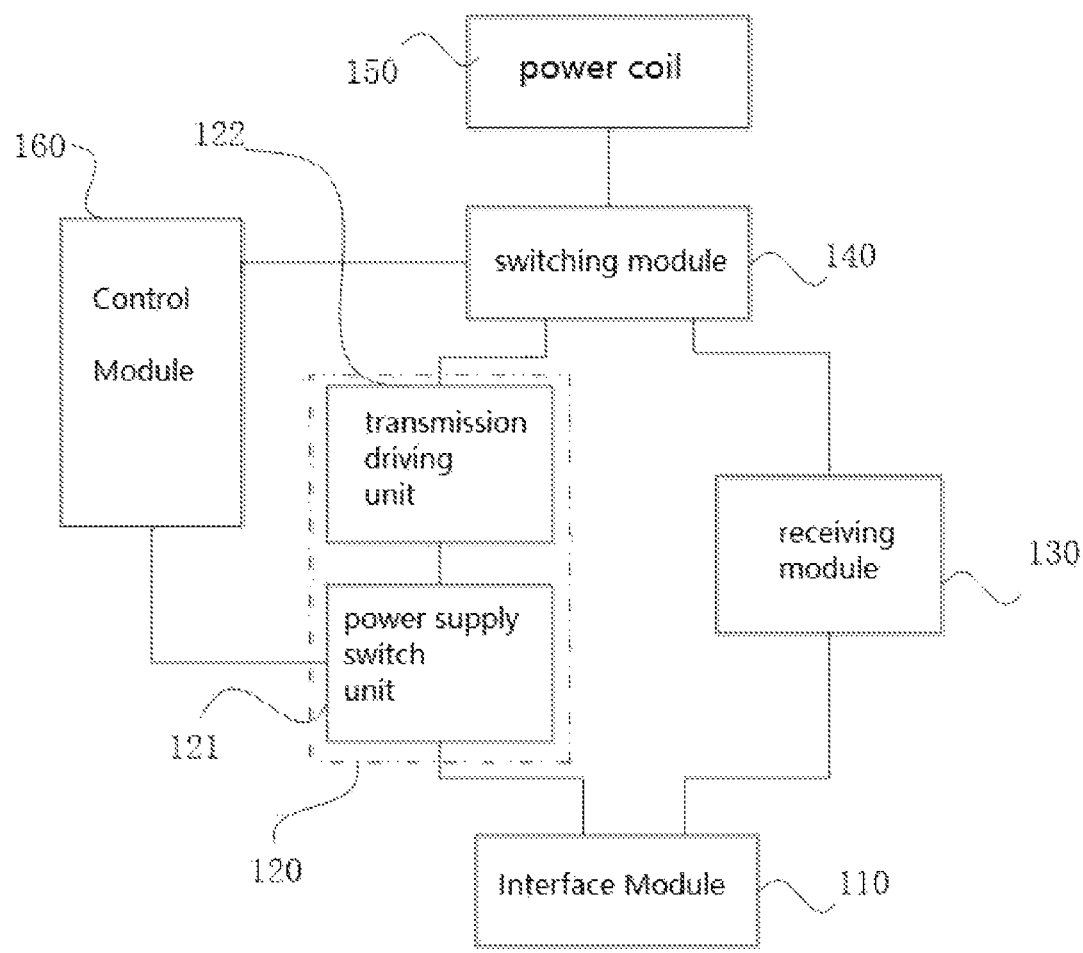
FIG. 1 is a schematic structural diagram of a wireless power transmitting and receiving circuit according to an embodiment of the present invention.

In the drawings: 110, interface module; 120, transmission driving module; 121, power supply switch unit; 122, transmission driving unit; 130, receiving module; 140, switching module; 150, power coil; 160, control module.

DETAILED DESCRIPTION OF THE EMBODIMENTS

The present invention will be further described with reference to the drawings and specific embodiments. It should be noted that on the premise that no conflict exists, a new embodiment can be formed by any combination of the various embodiments or various technical features described below.

As shown in FIG. 1, the wireless power transmitting and receiving circuit can be applied to a wireless power transmitting and receiving device. The wireless power transmitting and receiving circuit includes an interface module 110, a transmission driving module 120, a receiving module 130, a switching module 140, a power coil 150 and a control module 160. The transmission driving module 120 and the receiving module 130 are both connected to the interface module 110. The transmission driving module 120 includes a power supply switch unit 121 and a transmission driving unit 122. The control module 160 is configured to control the power supply switch unit 121 and the switching module 140. The power supply switch unit 121 is configured to connect or disconnect the interface module 110 to the transmission driving unit 122. The switching module 140 connects the transmission driving module 120 to the power coil 150 through switching, or connects the receiving module 130 to the power coil 150 through switching.

The wireless power transmitting and receiving device can include a rechargeable power source, such as a battery, which is connected to the wireless power transmitting and receiving circuit and the interface module 110 thereof. The electric energy of the rechargeable power supply can be converted into radio waves emitted by the power coil 150 through the transmission driving module 120. Also, the radio waves can be received through the power coil 150 and converted into electric energy through the receiving module 130, and the electric energy is stored in the rechargeable power supply.

Figure 2:
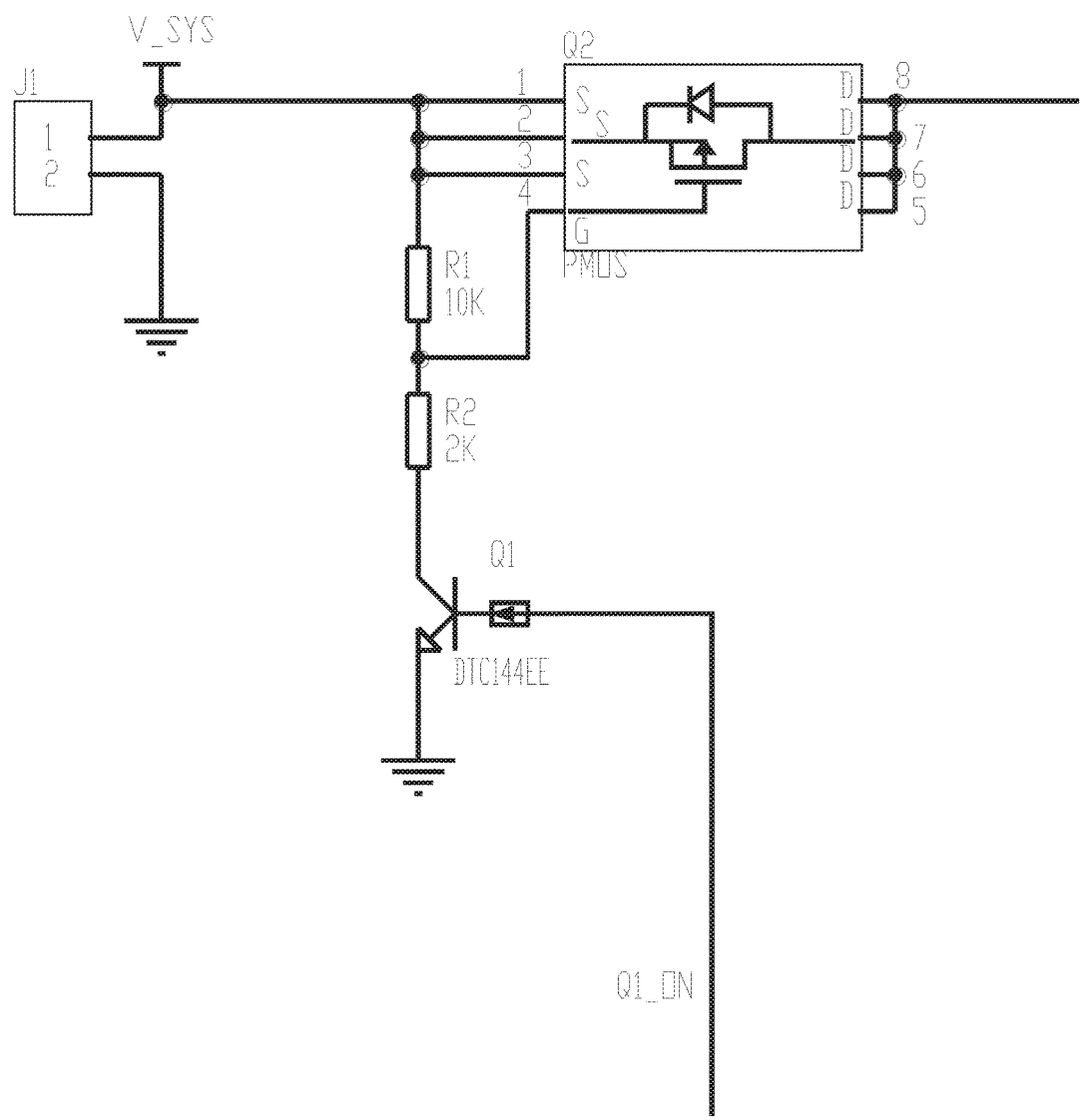
FIG. 2 is a circuit diagram of the power supply switch unit of FIG. 1.

The power supply switch unit 121 is shown in FIG. 2, and includes a PMOS tube Q2, the gate G of the PMOS tube Q2 is connected to the control pin Q1_ON of the control module 160. The source S of the PMOS tube Q2 is connected to the high-level V_SYS of the interface module 110. The drain D of the PMOS tube Q2 is connected to the transmission driving unit 122. When the control pin Q1_ON of the control module 160 enables the PMOS tube Q2 to be conducted, the power supply switch unit 121 enables the interface module 110 to be connected to the transmission driving unit 122. When the PMOS tube Q2 is turned off, the power supply switch unit 121 enables the interface module 110 to be disconnected from the transmission driving unit 122.

Figure 3:
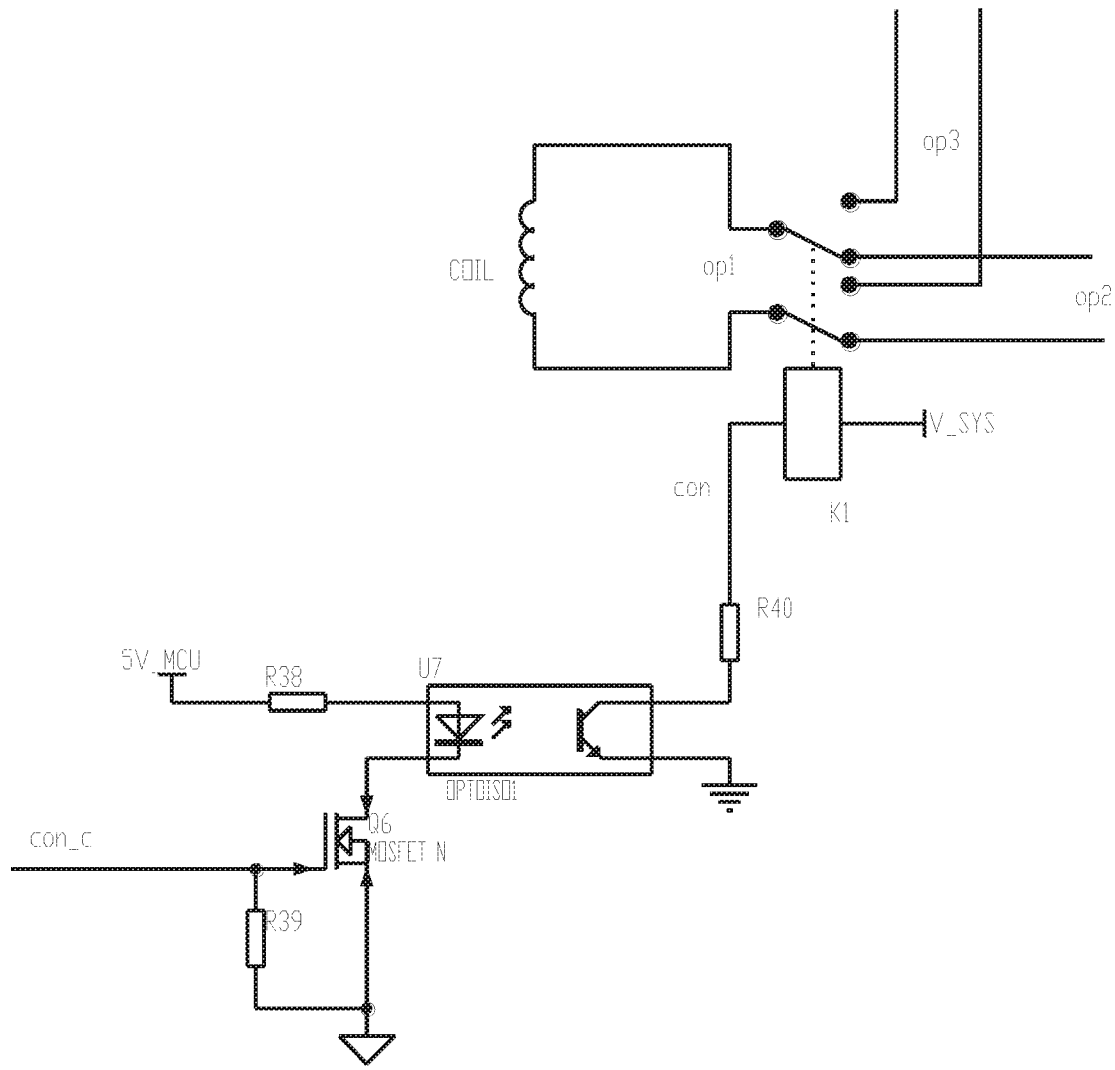
FIG. 3 is a circuit diagram of the switching module of FIG. 1.

As a preferred embodiment, as shown in FIG. 3, the switching module 140 includes a relay K1. The relay K1 includes a control end CON and a static contact end op1, a normally-closed contact end OP2 and a normally-open contact end OP3. The control end CON is connected to the control module 160, and the static contact end OP1 is connected to the power coil 150, namely, COIL.

The normally-closed contact terminal OP2 is connected to the transmission driving module 120, and the normally-open contact end OP3 is connected to the receiving module 130; or, the normally-closed contact end OP2 is connected to the receiving module 130, and the normally-open contact end OP3 is connected to the transmission driving module 120.

Figure 4:
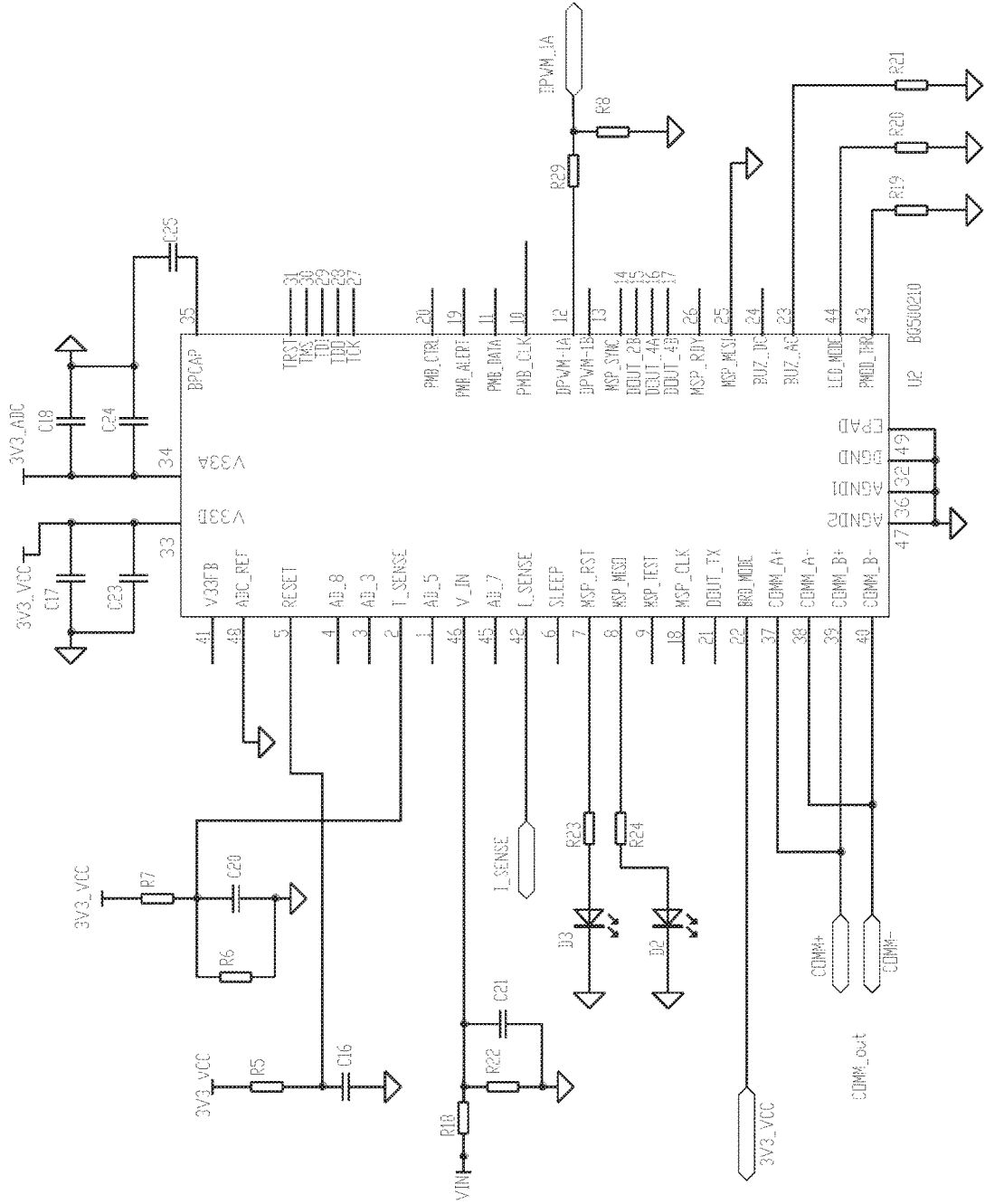
FIG. 4 is a circuit diagram of the transmission driving unit of FIG. 1.
Figure 5:
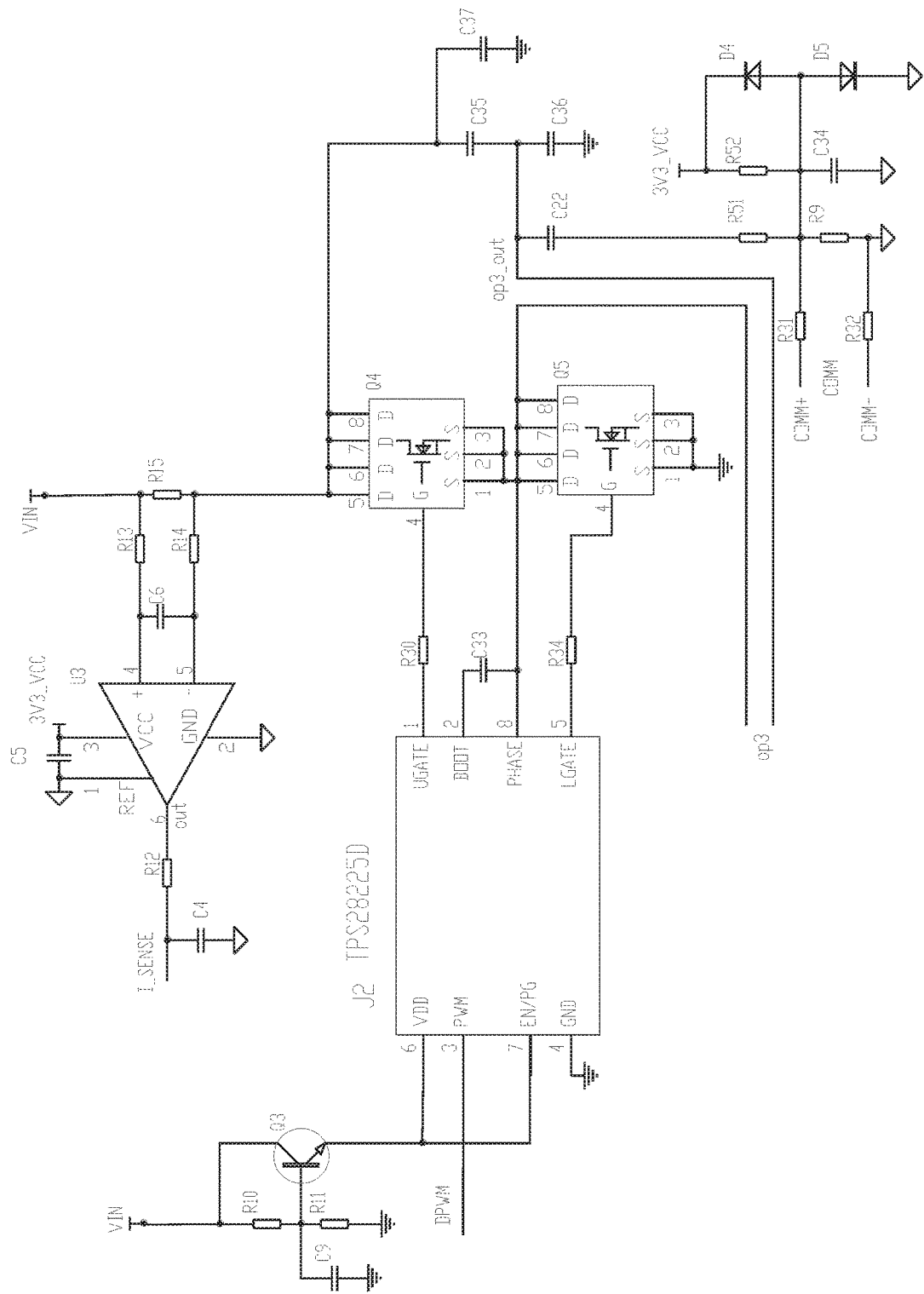
FIG. 5 is a circuit diagram of the power driving subunit of FIG. 1.

As a preferred embodiment, the transmission driving unit 122 includes a transmission control chip U2 as shown in FIG. 4 and a power driving subunit as shown in FIG. 5. Wherein the transmission control chip U2 includes a control pin DPWM_1A. In the embodiment, the transmission control chip U2 is BQ500210 chip. Further, the power driving subunit includes a control driving chip J2, a first power tube Q4 and a second power tube Q5. In this embodiment, the control driving chip is TPS28225D chip, and the first power tube and the second power tube are both AON7544 tubes.

The control driving chip J2 of the power driving subunit includes a controlled pin DPWM, the control pin DPWM_1A of the transmission control chip U2 is connected to the controlled pin DPWM of the control driving chip J2. The control driving chip J2 further includes a first driving pin UGATE and a second driving pin LGATE. The first driving pin UGATE is connected to the first power tube Q4, the second driving pin LGATE is connected to the second power tube Q5. The power driving subunit further includes a power output port OP3_OUT, the output of the first power tube Q4 and the output of the second power tube Q5 are both connected to the power output port OP3_OUT. The power output port OP3_OUT serves as the output of the transmitting driving module 120, and is connected to the normally-closed contact end OP2 or the normally-open contact end OP3 of the relay K1. The power output port OP3_OUT is configured to transmit power to the power coil 150.

As a preferred embodiment, the transmission control chip U2 further includes a feedback receiving pin I_SENSE, and a feedback circuit is arranged between the power output port OP3_OUT and the feedback receiving pin. In this embodiment, the feedback circuit includes a sampling resistor R15 and an amplifying circuit. The amplifying circuit includes an operational amplifier IN199A2, and the feedback circuit is configured to acquire the current value provided by the power output port OP3_OUT. The transmission control chip U2 obtains the feedback current value and can conduct over-current protection. Further, the output current is adjusted, and the power of the load coupled to the power coil 150 can also be obtained. For example, when the feedback current value obtained by the transmission control chip U2 is too large, the control pin DPWM_1A of the transmission control chip U2 can adjust and control the control driving chip J2 to enable the control driving chip J2 to reduce the output current value.

As a preferred embodiment, the transmission control chip U2 further includes a communication port COMM_OUT, and the communication port COMM_OUT can be connected to the power output port through the port COMM as shown in FIG. 5. The transmitting control chip U2 can obtain information conforming to the wireless power transmission protocol from the wireless power receiving device through the power output port, such as power, equipment serial numbers and the like, so as to carry out the management of a wireless charging process.

Figure 6:
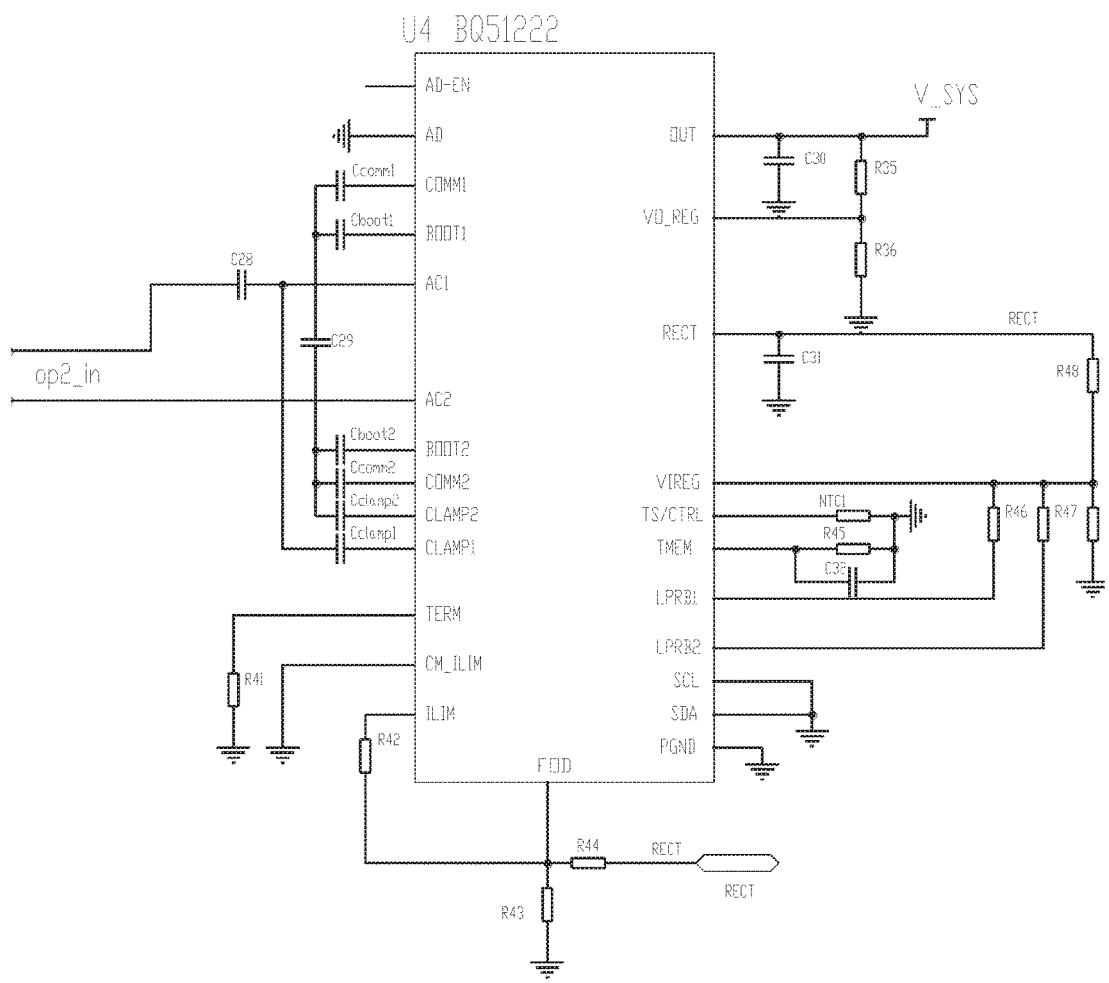
FIG. 6 is a circuit diagram of the receiving module of FIG. 1.

As a preferred embodiment, as shown in FIG. 6, the receiving module 130 includes a wireless receiving chip U4, and the wireless receiving chip U4 includes a power input port OP2_IN and a charging port V_SYS. The power input port OP2_IN is connected to the normally-open contact end OP3 or the normally-closed contact end OP2 of the relay K1.

The power input port OP2_IN is configured to obtain power from the power coil 150. The charging port V_SYS is connected to the interface module 110.

In this embodiment, the normally-closed contact end OP2 of the relay K1 is connected to the power input port OP2_IN of the receiving module 130. The normally-open contact end OP3 is connected to the power output port OP3_OUT of the transmission driving unit 122.

The control module 160 can trigger the wireless power transmitting and receiving circuit to be switched to a wireless transmitting function through triggering of keys and the like. The control module 160 controls the normally-open contact end OP3 of the relay K1 in the switching module 140 to be conducted with the static contact end OP1, so that the transmission driving module 120 is connected to the power coil 150. The control module 160 controls the PMOS tube Q2 in the power supply switch unit 121 to be conducted, so that the interface module 110 is connected to the transmission driving unit 122. The power supply connected to the interface module 110 can supply power to the transmission driving unit 122. The control pin DPWM_1A of the transmission control chip U2 outputs a control signal, and the control driving chip J2 amplifies the control signal so as to drive the first power tube Q4 and the second power tube Q5 to be conducted, so that the parameters such as the power output by the power supply connected to the interface module 110 to the power coil 150 are adjusted. At this moment, the power coil 150 is disconnected from the receiving module 130, so that the receiving module 130 does not work.

When the control module 160 obtains switching to receiving wireless power mode, or the feedback receiving pin I_SENSE of the transmission control chip U2 detects the load away from the transmission driving module 120, the control module 160 controls the power supply switch unit 121 to enable the interface module 110 to be disconnected from the transmission driving unit 122, and the relay K1 of the switching module 140 is controlled to connect the receiving module 130 to the power coil 150. Meanwhile, the transmission driving module 120 is disconnected from the power coil 150 to enter the receiving the wireless power mode. The wireless receiving chip U4 of the receiving module 130 obtains energy through the power coil 150, and the electric energy is transmitted to the interface module 110 through the charging port V_SYS. If the interface module 110 is connected to a rechargeable power supply, the wireless power transmitting and receiving circuit can charge the rechargeable power supply. If the interface module 110 is connected to an electricity utilization device, the wireless power transmitting and receiving circuit can supply power to the power utilization device.

According to the invention, the transmission driving module 120 is connected to the power coil 150 through switching controlled by the switching module 140, or the receiving module 130 is connected to the power coil 150 through switching, so that the power coil 150 can be used for a wireless power transmission mode and can also be used for a wireless power receiving mode. Meanwhile, the interface module 110 and the transmission driving unit 122 are disconnected by the power supply switch unit 121 in the wireless power receiving mode, so that the receiving module 130 can supply power to the interface module 110. The power coil 150 may include only one coil or one group of coils. The size of the device can be decreased and the cost can be reduced by using the wireless power transmitting and receiving circuit provided by the invention.

As a preferred embodiment, the transmission driving module 120 further includes a chip power supply unit (not shown). The chip power supply unit includes a power taking end and a power supply end. The power taking end is connected between the power supply switch unit 121 and the transmission driving unit 122. The power supply end is configured to provide electric energy or high level for the chips or elements in the transmission driving module 120. The power supply unit can use an existing DC-DC conversion circuit and is not further described in detail.

The embodiments of the present invention are only preferred embodiments of the present invention, and the scope of the protection scope of the present invention cannot be limited thereto. Any non-substantial changes and substitutions made by those skilled in the art on the basis of the present invention fall within the scope of the present invention.

What is claimed is:

1. A wireless power transmitting and receiving circuit, comprising:
   an interface module,
   a transmission driving module,
   a receiving module,
   a switching module,
   a power coil, and
   a control module,
   wherein
   the transmission driving module and the receiving module are both connected to the interface module,
   the transmission driving module includes a power supply switch unit and a transmission driving unit,
   the control module is configured to control the power supply switch unit and the switching module,
   the power supply switch unit is configured to connect or disconnect the interface module to the transmission driving unit,
   the switching module is configured to connect the transmission driving module to the power coil through switching, or the switching module is configured to connect the receiving module to the power coil through switching.

2. The wireless power transmitting and receiving circuit according to claim 1, wherein
   the switching module includes a relay,
   the relay includes a control end, a static contact end, a normally-closed contact end, and a normally-open contact end;
   the control end is connected to the control module,
   the static contact end is connected to the power coil;
   the normally-closed contact terminal is connected to the transmission driving module, and the normally-open contact end is connected to the receiving module;
   or,
   the normally-closed contact end is connected to the receiving module, and the normally-open contact end is connected to the transmission driving module.

3. The wireless power transmitting and receiving circuit according to claim 2, wherein
   the receiving module includes a wireless receiving chip,
   the wireless receiving chip includes a power input port and a charging port;
   the power input port is configured to obtain power from the power coil, and
   the charging port is connected to the interface module.

4. The wireless power transmitting and receiving circuit according to claim 2, wherein the transmission driving module further includes a chip power supply unit,
the chip power supply unit includes a power taking end, and
the power taking end is connected between the power supply switch unit and the transmission driving unit.

5. The wireless power transmitting and receiving circuit according to claim 1, wherein
the transmission driving unit includes a transmission control chip and a power driving subunit,
the transmission control chip includes a control pin,
the power driving subunit includes a controlled pin and a power output port;
the control pin is connected to the controlled pin, and
the power output port is configured to transmit power to the power coil.

6. The wireless power transmitting and receiving circuit according to claim 5, wherein
the transmission control chip further includes a feedback receiving pin, and
a feedback circuit is arranged between the power output port and the feedback receiving pin.

7. The wireless power transmitting and receiving circuit according to claim 6, wherein
the power driving subunit includes a control driving chip, a first power tube, and a second power tube;
the controlled pin is located on the control driving chip;
the control driving chip further includes a first driving pin and a second driving pin,
the first driving pin is connected to the first power tube,
the second driving pin is connected to the second power tube; and
an output of the first power tube and an output of the second power tube are both connected to the power output port.

8. The wireless power transmitting and receiving circuit according to claim 6, wherein
the receiving module includes a wireless receiving chip,
the wireless receiving chip includes a power input port and a charging port;
the power input port is configured to obtain power from the power coil, and the charging port is connected to the interface module.

9. The wireless power transmitting and receiving circuit according to claim 6, wherein
the transmission driving module further includes a chip power supply unit,
the chip power supply unit includes a power taking end, and
the power taking end is connected between the power supply switch unit and the transmission driving unit.

10. The wireless power transmitting and receiving circuit according to claim 5, wherein
the transmission control chip further includes a communication port, and
the communication port is connected to the power output port.

11. The wireless power transmitting and receiving circuit according to claim 10, wherein
the power driving subunit includes a control driving chip, a first power tube and a second power tube;
the controlled pin is located on the control driving chip;
the control driving chip further includes a first driving pin and a second driving pin,
the first driving pin is connected to the first power tube,
the second driving pin is connected to the second power tube; and
an output of the first power tube and an output of the second power tube are both connected to the power output port.

12. The wireless power transmitting and receiving circuit according to claim 10, wherein
the receiving module includes a wireless receiving chip,
the wireless receiving chip includes a power input port and a charging port;
the power input port is configured to obtain power from the power coil, and
the charging port is connected to the interface module.

13. The wireless power transmitting and receiving circuit according to claim 10, wherein
the transmission driving module further includes a chip power supply unit,
the chip power supply unit includes a power taking end, and
the power taking end is connected between the power supply switch unit and the transmission driving unit.

14. The wireless power transmitting and receiving circuit according to claim 5, wherein
the power driving subunit includes a control driving chip, a first power tube, and a second power tube;
the controlled pin is located on the control driving chip;
the control driving chip further includes a first driving pin and a second driving pin,
the first driving pin is connected to the first power tube,
the second driving pin is connected to the second power tube; and
an output of the first power tube and an output of the second power tube are both connected to the power output port.

15. The wireless power transmitting and receiving circuit according to claim 14, wherein
the control driving chip is a TPS28225D chip, and
the first power tube and the second power tube are both AON7544 tubes.

16. The wireless power transmitting and receiving circuit according to claim 5, wherein
the receiving module includes a wireless receiving chip,
the wireless receiving chip includes a power input port and a charging port;
the power input port is configured to obtain power from the power coil, and
the charging port is connected to the interface module.

17. The wireless power transmitting and receiving circuit according to claim 5, wherein
the transmission driving module further includes a chip power supply unit,
the chip power supply unit includes a power taking end, and
the power taking end is connected between the power supply switch unit and the transmission driving unit.

18. The wireless power transmitting and receiving circuit according to claim 1, wherein
the receiving module includes a wireless receiving chip,
the wireless receiving chip includes a power input port and a charging port;
the power input port is configured to obtain power from the power coil, and
the charging port is connected to the interface module.

19. The wireless power transmitting and receiving circuit according to claim 1, wherein
the transmission driving module further includes a chip power supply unit,
the chip power supply unit includes a power taking end, and the power taking end is connected between the power supply switch unit and the transmission driving unit.

20. A wireless power transmitting and receiving device, comprising
a wireless power transmitting and receiving circuit, wherein
the wireless power transmitting and receiving circuit includes an interface module, a transmission driving module, a receiving module, a switching module, a power coil, and a control module,
the transmission driving module and the receiving module are both connected to the interface module,
the transmission driving module includes a power supply switch unit and a transmission driving unit,
the control module is configured to control the power supply switch unit and the switching module,
the power supply switch unit configured to connect or disconnect the interface module to the transmission driving unit,
the switching module is configured to connect the transmission driving module to the power coil through switching, or the switching module is configured to connect the receiving module to the power coil through switching.

* * * * *